(12) United States Patent
Tsai (10) Patent No.: US 6,644,874 B2
(45) Date of Patent: Nov. 11, 2003

(54) KEYBOARD WITH LIQUID-DRAINING FUNCTION

(75) Inventor: Ching Cheng Tsai, Taipei Hsien (TW)

(73) Assignee: Chicony Electronics Co., Ltd., Taipei Hsien (TW)

(*) Notice: Subject to any disclaimer, the term of this patent is extended or adjusted under 35 U.S.C. 154(b) by 0 days.

(21) Appl. No.: 10/035,171

(22) Filed: Jan. 4, 2002

(65) Prior Publication Data

US 2003/0129010 A1 Jul. 10, 2003

(51) Int. Cl.[7] ................................................ B41J 29/12
(52) U.S. Cl. ....................... 400/490; 400/495; 400/472; 200/302.1; 200/302.2
(58) Field of Search ................................ 400/472, 490, 400/491.2, 495, 486, 495.1, 496, 480, 488, 491.1; 200/302.1, 302.2, 302.3

(56) References Cited

U.S. PATENT DOCUMENTS

| | | | | |
|---|---|---|---|---|
| 5,613,223 A | * | 3/1997 | Ross et al. ................... | 455/575 |
| 5,734,136 A | * | 3/1998 | Newcomer et al. .......... | 200/5 A |
| 5,810,491 A | * | 9/1998 | Muller et al. ................ | 400/496 |
| 6,054,939 A | * | 4/2000 | Wei et al. ...................... | 341/20 |
| 6,443,644 B1 | * | 9/2002 | Takeda et al. ............... | 400/490 |
| 6,467,683 B2 | * | 10/2002 | Jun .......................... | 235/145 R |

* cited by examiner

Primary Examiner—Leslie J. Evanisko
Assistant Examiner—Kevin D. Williams
(74) Attorney, Agent, or Firm—Bacon & Thomas, PLLC (57) ABSTRACT

A keyboard with liquid-draining function, at least including: keys, elastic body layer, circuit board layer, bottom board and sealing layer; wherein the bottom board is installed with at least a liquid-draining hole, with the dividing mechanism being installed between the circuit board layer and the bottom board to form a liquid-draining space. The liquid-draining space and the liquid-draining hole are connected for the purpose of draining liquid that is accidentally poured into the keyboard, so that liquid flowing down through the keys can be drained away swiftly via the liquid-draining space and drained out of the keyboard through the liquid-draining hole, thus preventing liquid from accumulating in the keyboard, and maintaining the normal operation of the keyboard.

6 Claims, 12 Drawing Sheets

KEYBOARD WITH LIQUID-DRAINING FUNCTION

SUMMARY OF THE INVENTION

1. Field of the Invention

The present invention relates to a keyboard with liquid-draining function, more particularly, a keyboard for notebook computers, characterized in that, the liquid-draining space and liquid-draining hole are formed inside the keyboard to drain away liquid accidentally poured into the keyboard, thus preventing liquid from accumulating in the keyboard, and maintaining the normal operation of the keyboard.

2. Description of the Related Art

Figure 1:
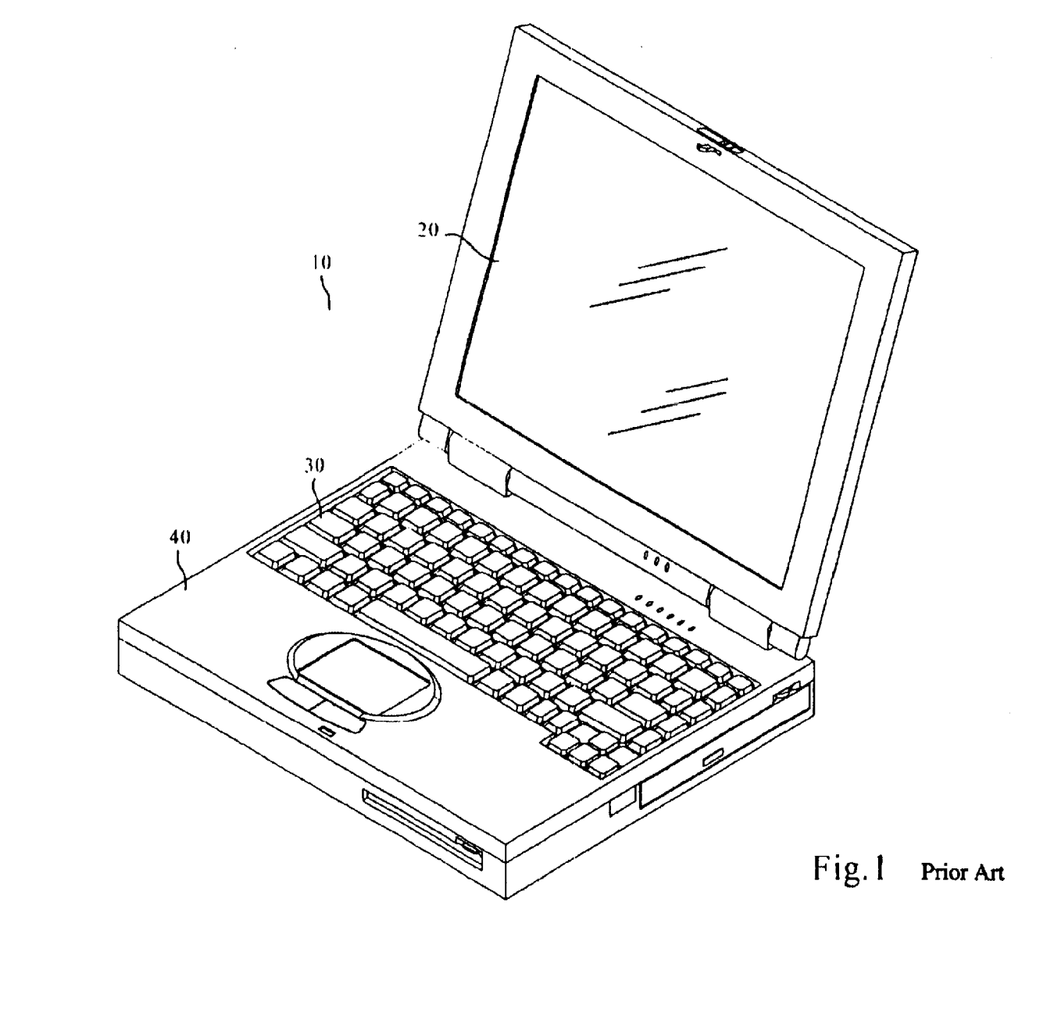
FIG. 1 shows a perspective view of the notebook computer under the state of being opened.
Figure 2:
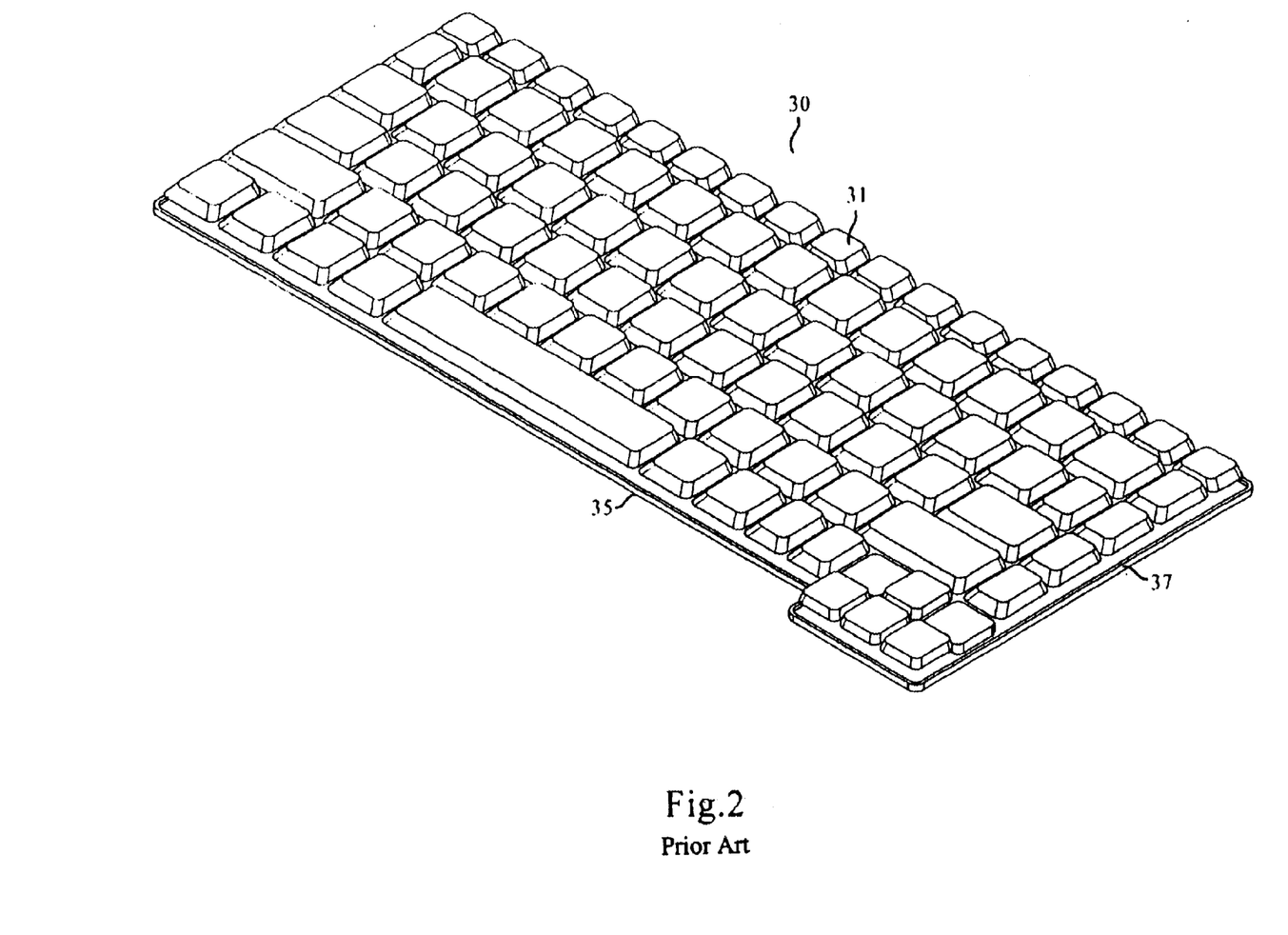
FIG. 2 shows a perspective view of a conventional keyboard used for the notebook computer shown in FIG. 1.
Figure 3:
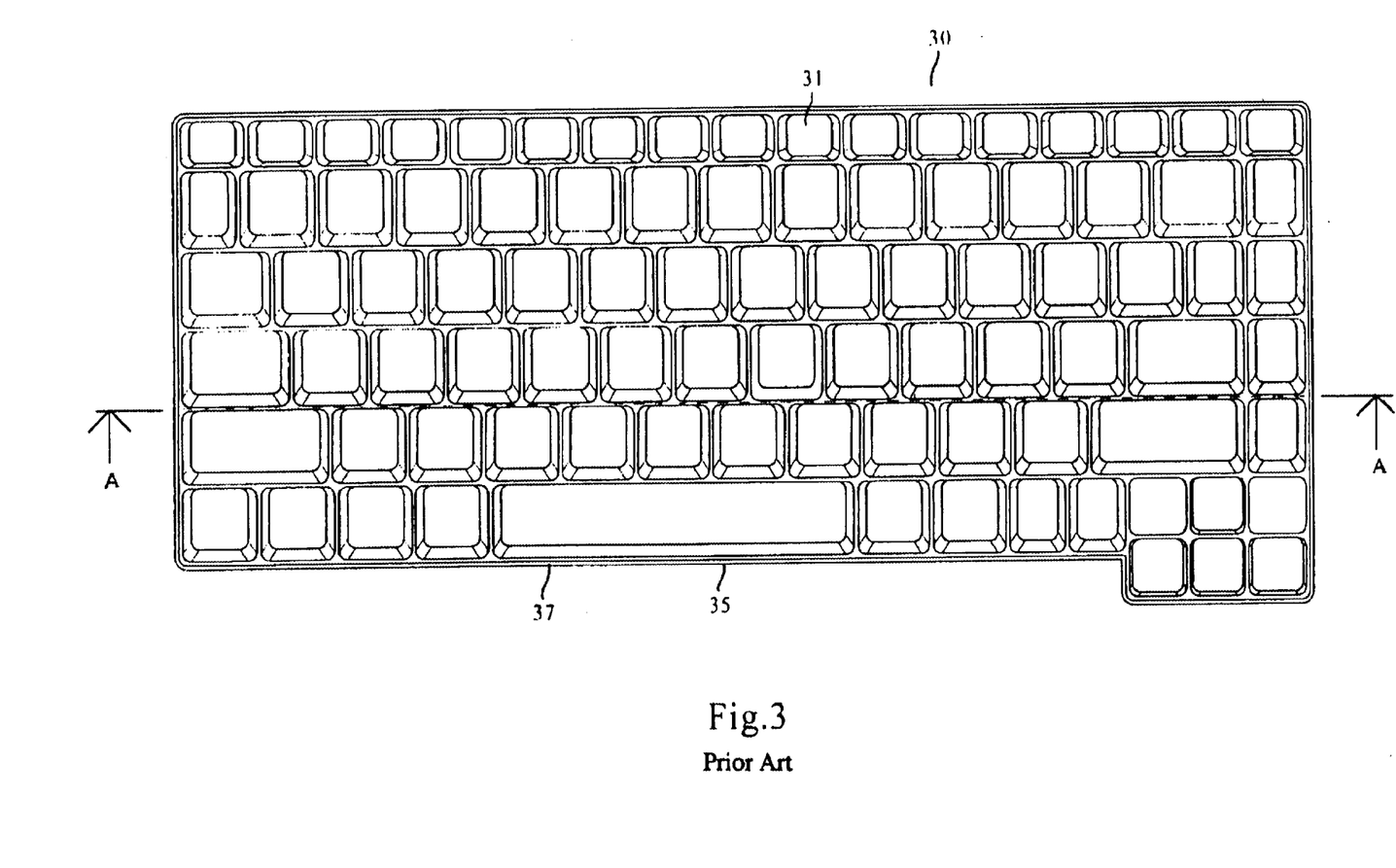
FIG. 3 shows a top plan view of the keyboard shown in FIG. 2.
Figure 4:
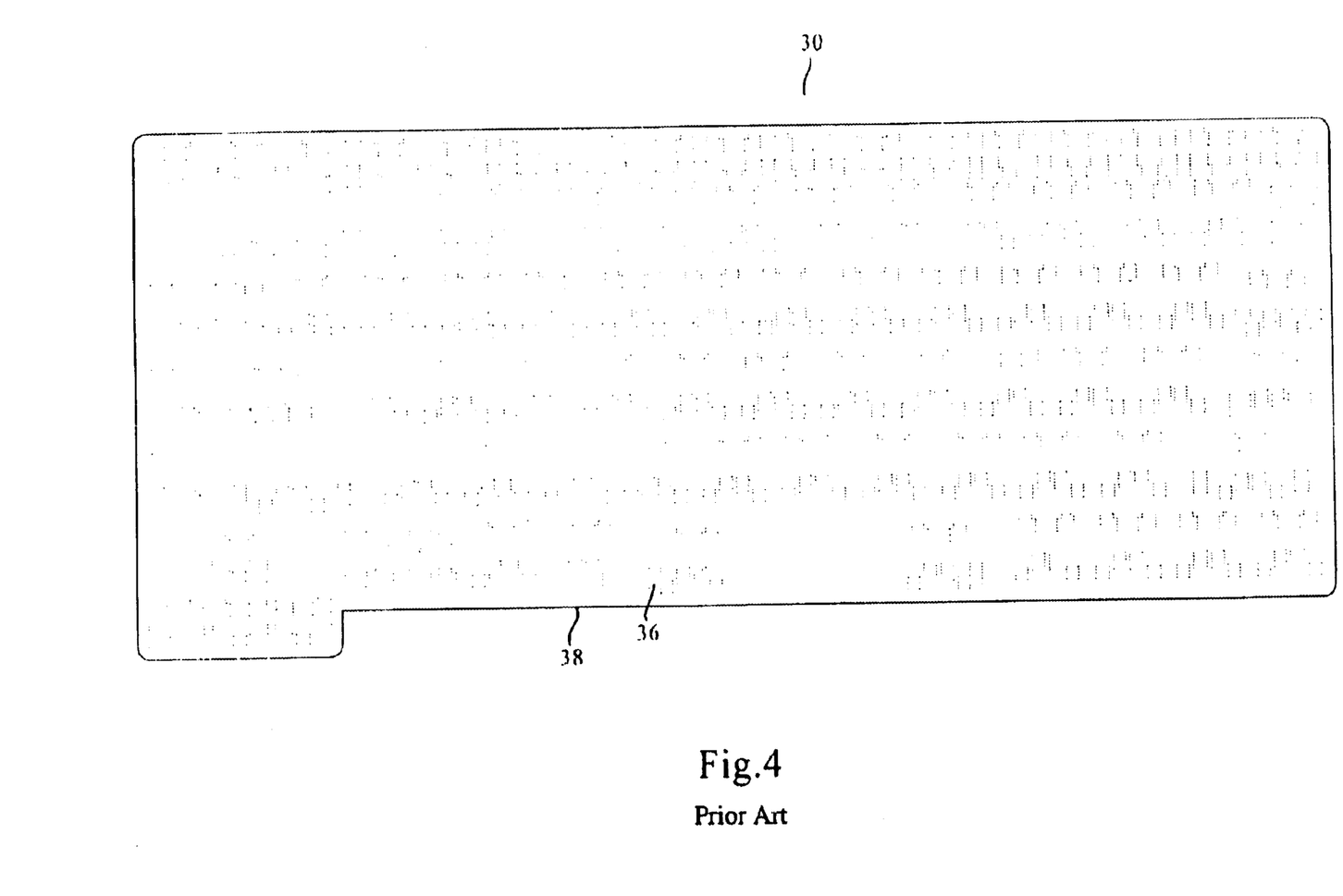
FIG. 4 shows a bottom plan view of the keyboard shown in FIG. 2.
Figure 5:
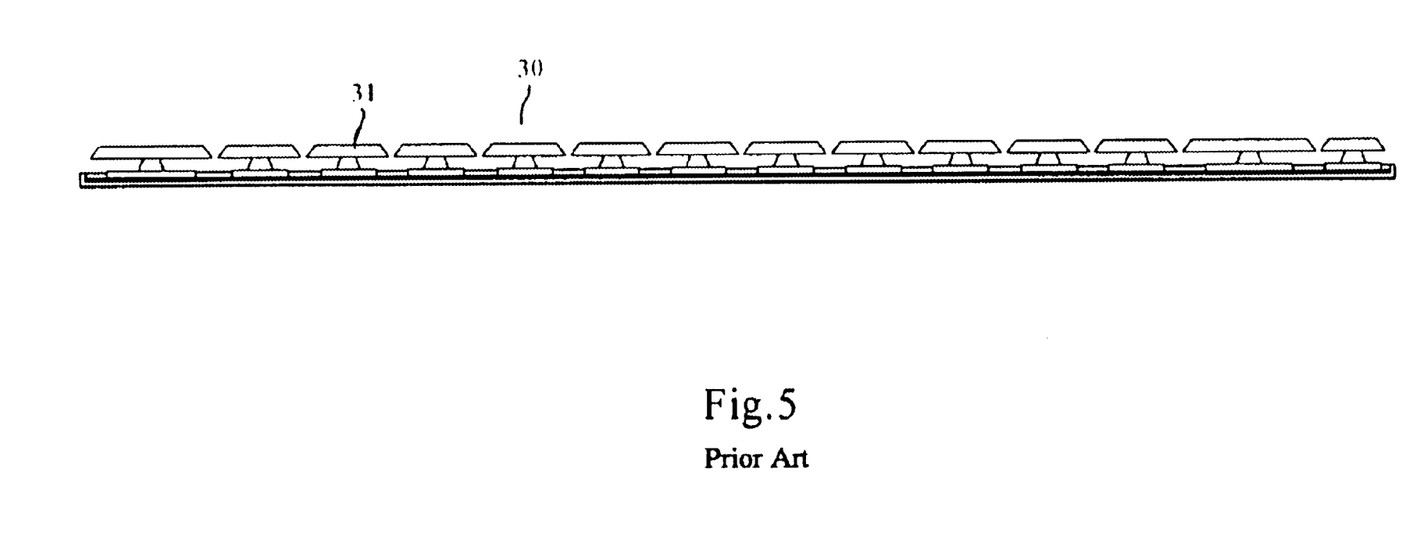
FIG. 5 shows a cross-sectional structural view of the line A—A shown in FIG. 3.
Figure 6:
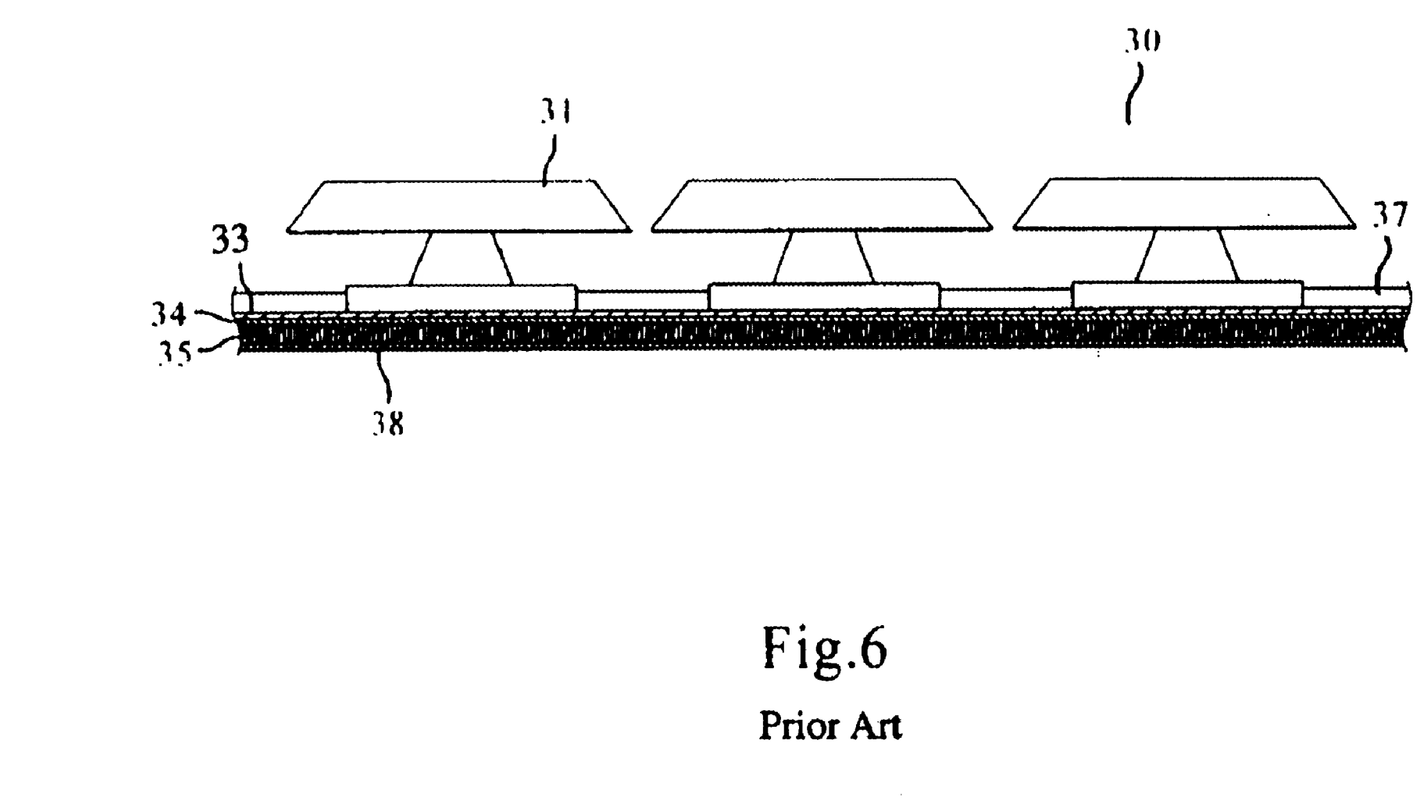
FIG. 6 shows a partially enlarged cross-sectional structural view of FIG. 5.

A general notebook computer 10, as shown in FIG. 1, mainly comprises a screen 20, a keyboard 30 and a casing 40; wherein the screen 20 and the casing 40 are integrally connected via the hinge mechanism. The keyboard 30 is installed on the casing 40, wherein a motherboard adhered on the surface with CPU and other electronic units is contained; the motherboard is located under the keyboard 30.

As shown in FIG. 2 to FIG. 6, the keyboard 30 includes a plurality of keys 31; the elastic body layer 33 that, installed under a plurality of keys 31, contains and fixates the keys 31; the circuit board layer 34 under the elastic body layer 33; the bottom board 35 that, installed under the circuit board layer 34 with upturning edge 37 along the sides thereof, is for fixating the elastic body layer 33 and the circuit board layer 34; and the sealing layer 38 adhered onto the lower surface of the bottom board 35.

The bottom board 35 is distributed with a plurality of apertures 36 formed via the means of pressure-punching (refer to FIG. 4), and during the process of pressure-punching, lugs are also formed to lock and fix the elastic body layer 33 and the circuit board layer 34 (not shown in figures). The elastic body layer 33 and the circuit board layer 34 are respectively installed with apertures to correspond with apertures 36 on the bottom board 35, thus lugs installed on the bottom board 35 can pierce through for buckling and fixating the keys 31, the elastic body layer 33 and the circuit board layer 34 to form an integral part. The bottom board 35 is further installed with fixating bolt (not shown in figures), so as to fixate the keyboard 30 onto the casing 40 and keep certain distance between the keyboard 30 and the motherboard in the casing 40.

The bottom board 35 that contains the keys 31, the elastic body layer 33 and the circuit board layer 34, since it has to absorb the force from the user's hitting the keys 31, shall be made of rigid and durable material, e.g., metal, so as to prevent the keyboard 30 from being bent and deformed; as to the sealing layer 38, it should especially be made of lamellar waterproofing material for the purpose of waterproofing. Since the composition of the keyboard 30 is of conventional art, it is no need to describe the detailed structure thereof here.

The notebook computer 10 (please refer to FIG. 1), with the convenient features of lighter weight and smaller volume, thus easy to be carried around, demands higher prices than those of desktop computers. In order to avoid the situation that the expensive notebook computer being easily damaged when the user, while operating the notebook computer, accidentally pours liquid into the keyboard 30, the conventional keyboard 30 is installed with the sealing layer 38 on the lower surface of the bottom board 35, therefore making the keyboard 30 a waterproof keyboard, for the purpose of stopping the liquid poured in from flowing through the apertures 36 of the bottom board 35 down to the circuit board. By using the sealing layer 38 to seal the apertures 36 of the bottom board 35, it is to be assured that the circuit board is not to be damaged by liquid dripping down from the aperture 36 of the bottom board 35, and the normal operation of the notebook computer is to be maintained.

Nevertheless, even though the bottom board 35 is installed with upturning edges 37 to hold liquid accidentally poured inside, the holding volume is not without limit. Thus when too much liquid is poured inside the keyboard 30, liquid would flow over the upturning edges 37 and reach the motherboard under the keyboard 30, therefore causing damages to the motherboard and making the computer inoperable. Even if liquid poured into the keyboard 35 can be held within the confinement of the upturning edges 37, liquid inside the keyboard 35 still cannot be removed out of the keyboard 35 by means of biasing the keyboard 35 (because the biasing of the keyboard 35 shall cause liquid to flow into the motherboard). The only way is to shut down the computer and wait for liquid to be naturally vaporized, a solution that is tremendously time-wasting.

In conclusion, the conventional waterproofing keyboard 30 can only be waterproofing without the function of draining away liquid accumulated inside, a design flaw that desperately needs to be improved upon.

SUMMARY OF THE INVENTION

The object of the present invention is to provide a keyboard with liquid-draining function that, applied on notebook computers, utilizes the liquid-draining space and the liquid-draining hole formed inside the keyboard to drain away liquid accidentally poured into the keyboard, thus liquid can be drained away from the keyboard swiftly via the liquid-draining space and the liquid-draining hole, so as to prevent liquid from accumulating in the keyboard, and maintain the normal operational function of the keyboard.

For achieving the aforementioned object, the keyboard with liquid-draining function of the present invention at least includes a plurality of keys, the elastic body layer located under the plurality of key to contain the plurality of keys, the circuit board layer located under the elastic body layer, the bottom board that, located under the circuit board layer, is used for locking and fixating the keys, the elastic body layer and the circuit board layer, and the sealing layer that adheres to the lower surface of the bottom board. At least one liquid-draining hole is installed on the bottom board, and a liquid-draining space is formed between the circuit board layer and the bottom board by the dividing mechanism; the liquid-draining hole and the liquid-draining space are connected, so that liquid accidentally poured into the keyboard can be drained away through the liquid-draining space and the liquid-draining hole, thus liquid poured in from the keys can be swiftly drained away via the liquid-draining space and the liquid-draining hole, so as to prevent liquid from accumulating in the keyboard, and maintain the normal operational function of the keyboard.

The first embodiment of the dividing mechanism is formed and distributed on the lower surface of the circuit board layer, and comes into contact with the upper surface of the bottom board, thus forming the liquid-draining space between the circuit board layer and the bottom board.

The second embodiment of the dividing mechanism is formed and distributed on the upper surface of the bottom board, and comes into contact with the lower surface of the circuit board layer, thus forming the liquid-draining space between the circuit board layer and the bottom board.

The third embodiment of the dividing mechanism is formed and distributed on both the lower surface of the circuit board layer and the upper surface of the bottom board with interlocking installation, thus forming the liquid-draining space between the circuit board layer and the bottom board.

The dividing mechanism is integrally formed on the circuit board layer and/or the bottom board.

The upturning edges can also be formed during the forming of the liquid-draining hole through the pressure-punching method, so as to expedite the water-draining process.

The keyboard is biasly installed on the casing.

BRIEF DESCRIPTION OF THE DRAWINGS

These and other features, aspects and advantages of the present invention will become better understood with regard to the following description, appended claims and accompanying drawings that are provided only for further elaboration without limiting or restricting the present invention, where:

DETAILED DESCRIPTION OF THE PREFERRED EMBODIMENT

Figure 7:
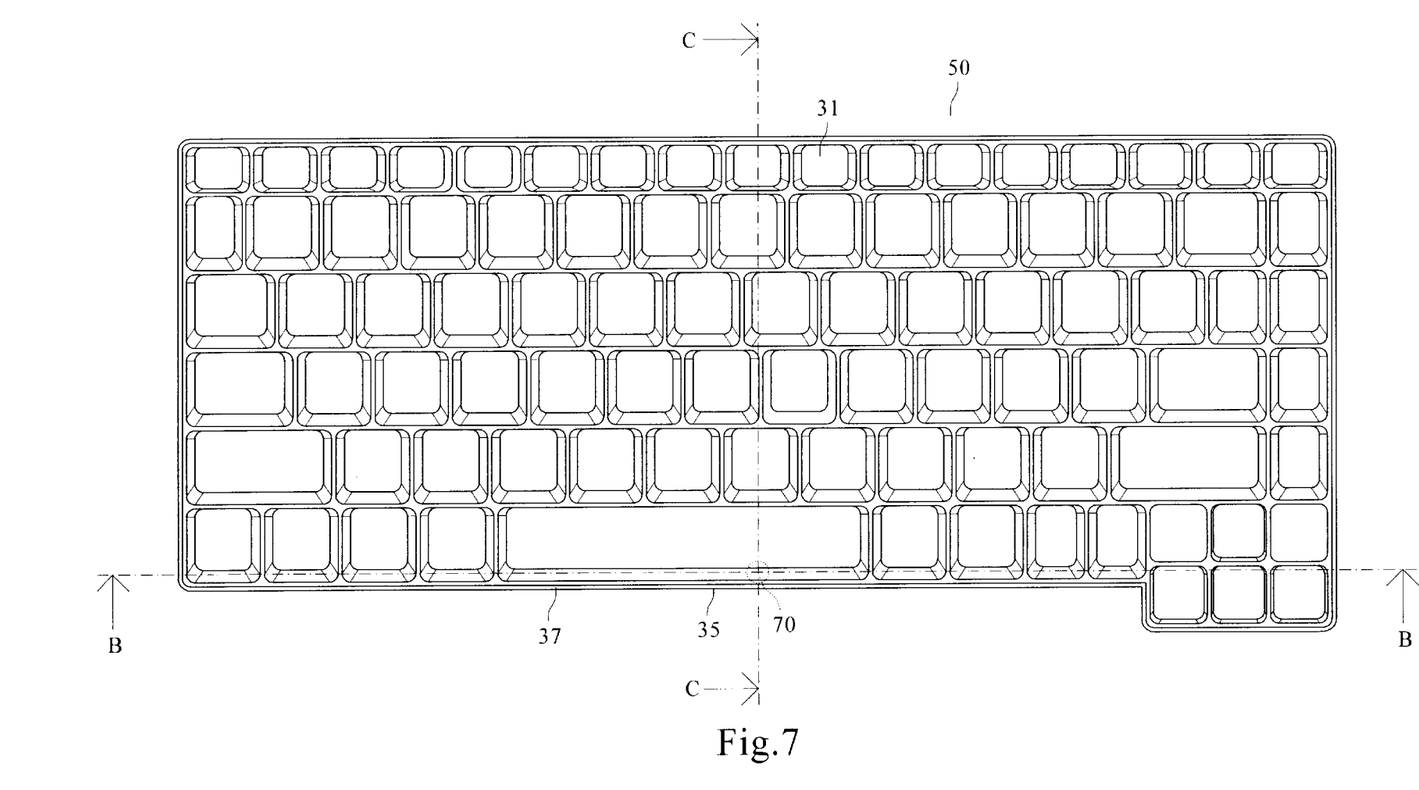
FIG. 7 shows a top plan view of the keyboard with liquid-draining function of the present invention.
Figure 8:
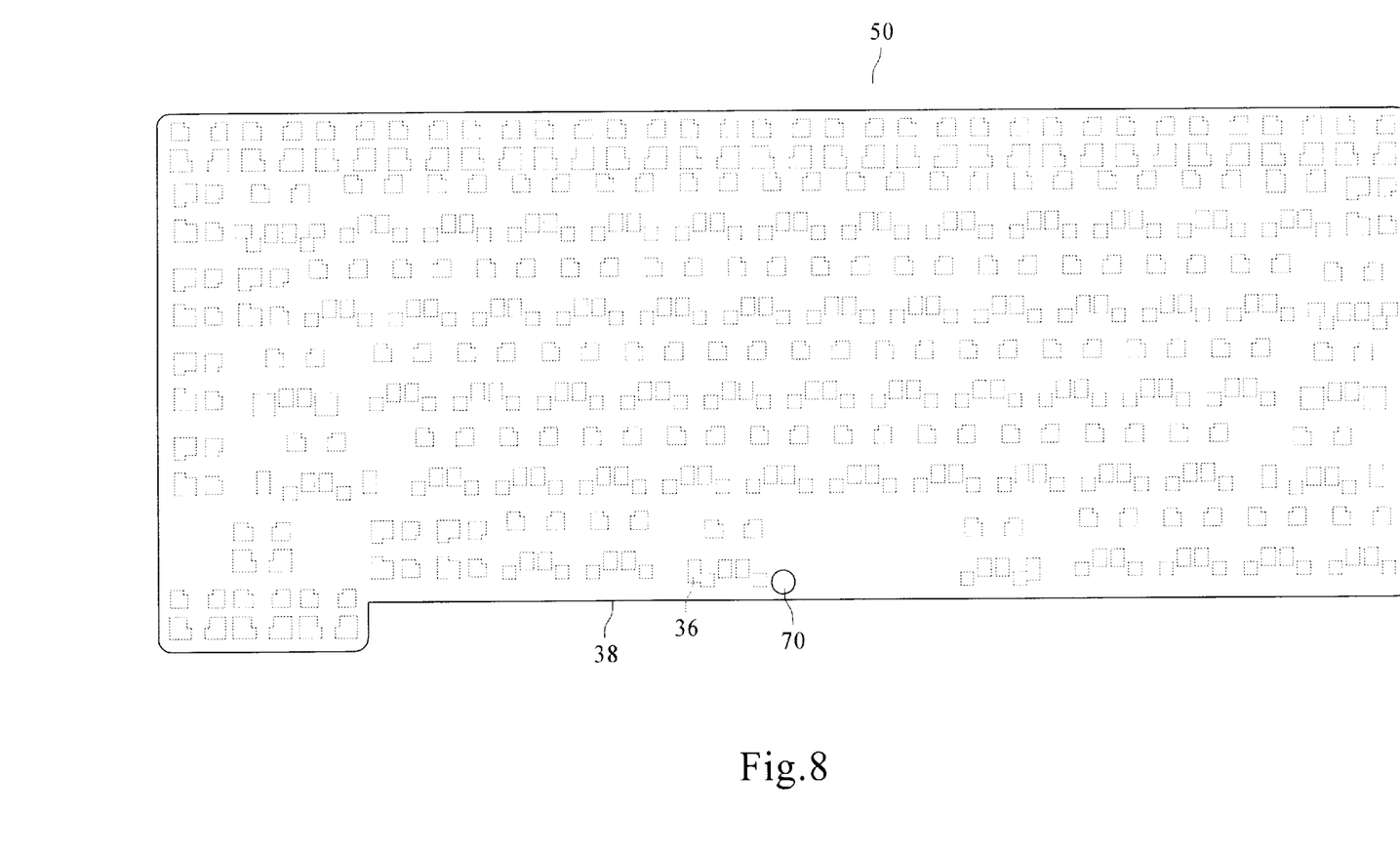
FIG. 8 shows a bottom plan view of the keyboard shown in FIG. 7.
Figure 9:
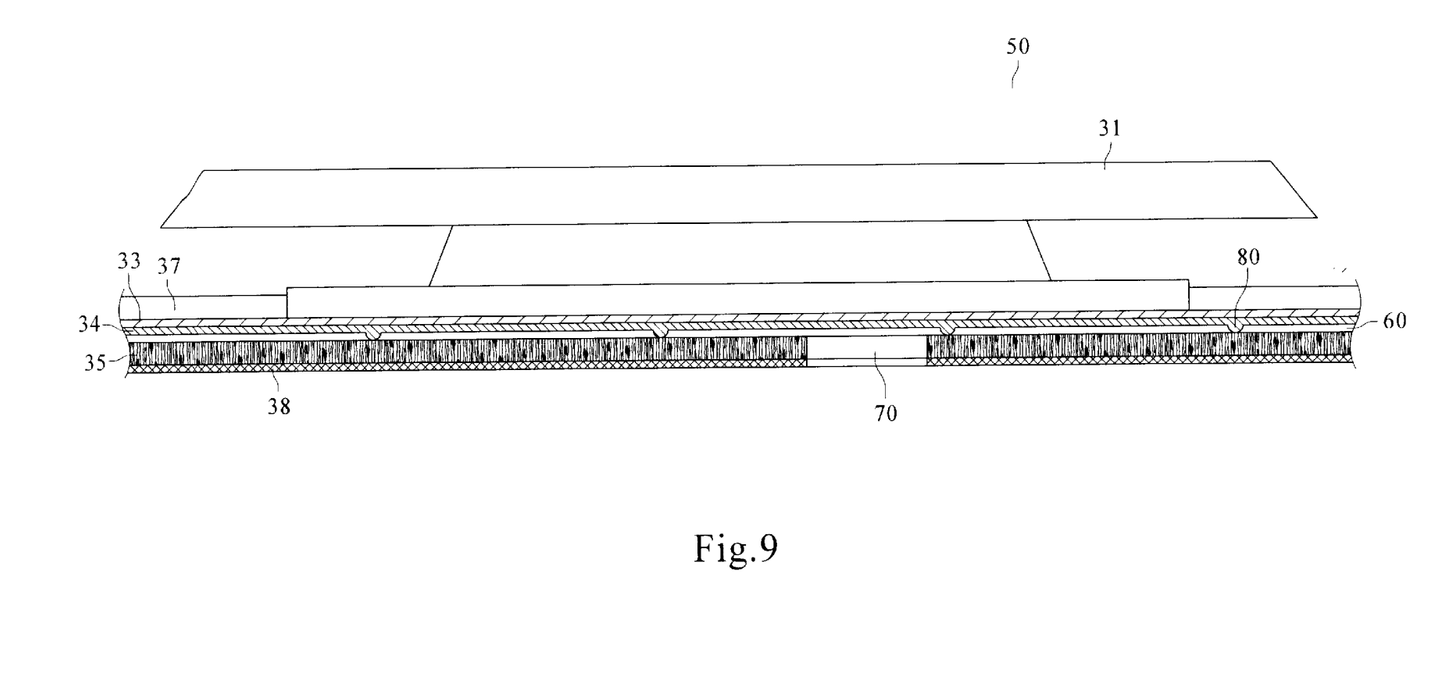
FIG. 9 shows a partially enlarged cross-sectional structural view of line B—B in FIG. 7, wherein the liquid-draining space and liquid-draining hole of the present invention are shown.

Please refer to FIG. 7 to FIG. 9, the keyboard 50 with liquid-draining function of the present invention at least includes a plurality of keys 31; the elastic body layer 33 that, installed under the plurality of keys 31, contains and fixates the keys 31; the circuit board layer 34 under the elastic body layer 33; the bottom board 35 that, installed under the circuit board layer 34 with upturning edge 37 along the sides thereof, is for fixating the keys 31, elastic body layer 33 and the circuit board layer 34; and the sealing layer 38 adhered onto the lower surface of the bottom board 35. The aforementioned composition is identical to that of the conventional keyboard 30.

The keyboard with liquid-draining function 50 of the present invention is characterized in that, at least one liquid-draining hole 70 is installed on the bottom board 35, and a plurality of dividing mechanisms 80 are installed on the lower surface of the circuit board layer 34, with each dividing mechanism 80 coming into contact with the upper surface of the bottom board 35, thus forming a liquid-draining space 60 through the installation of the dividing mechanisms between the circuit board layer 34 and the bottom board 35; the liquid-draining space 60 and the liquid-draining hole 70 are connected. Since the liquid-draining hole 70 is installed on the bottom board 35, it is no need for the sealing layer 38 to seal the liquid-draining hole, which is easy to understand.

When a computer user accidentally pours liquid, like soft drinks, into the keyboard 50, such liquid would flow down, through the slits among keys 31 and apertures for buckling and fixating the elastic body layer 33 and the circuit board layer 34, to the liquid-draining space 60, and afterwards flow through the liquid-draining hole 70 to a container beneath the liquid-draining hole 70 (not shown in figures, installed inside the casing 40), so that liquid poured into the keyboard 50 can be drained away from the casing 40, thus preventing liquid from accumulating in the keyboard, and maintaining the normal operational function of the keyboard.

The liquid-draining space 60 is installed between the circuit board layer 34 and the bottom board 35, and its ability to swiftly drain liquid away by not stopping liquid from flowing is because the material of the circuit board layer 34 is made of plastic, and the material of the bottom board 35 is made of metal, both materials that have small damping effect (small friction coefficient). As to the elastic body layer 33, which is made of rubber with larger friction coefficient to stop liquid from flowing freely, it is therefore not suitable for the liquid-draining space to be installed between the elastic body layer 33 and the circuit board layer 34. However, if the lower surface of the elastic body layer 33 can be processed to lower the friction coefficient, it is then suitable for the liquid-draining space 60 to be installed between the elastic body layer 33 and the circuit board layer 34.

The dividing mechanism 80 is integrally formed, e.g., by using the printing method to form the dividing mechanism on the lower surface of the circuit board layer 34 with nodes, so as to create distance between the lower surface of the circuit board layer 34 and the upper surface of the bottom board 35, forming the liquid-draining space 60. Experiments show that, if the aforementioned distance is 0.04 mm, it is enough for liquid to flow in such a space. The preferred allocation of the dividing mechanisms 80 is to put them in the four corners of the area beneath the keys 31.

Figure 10:
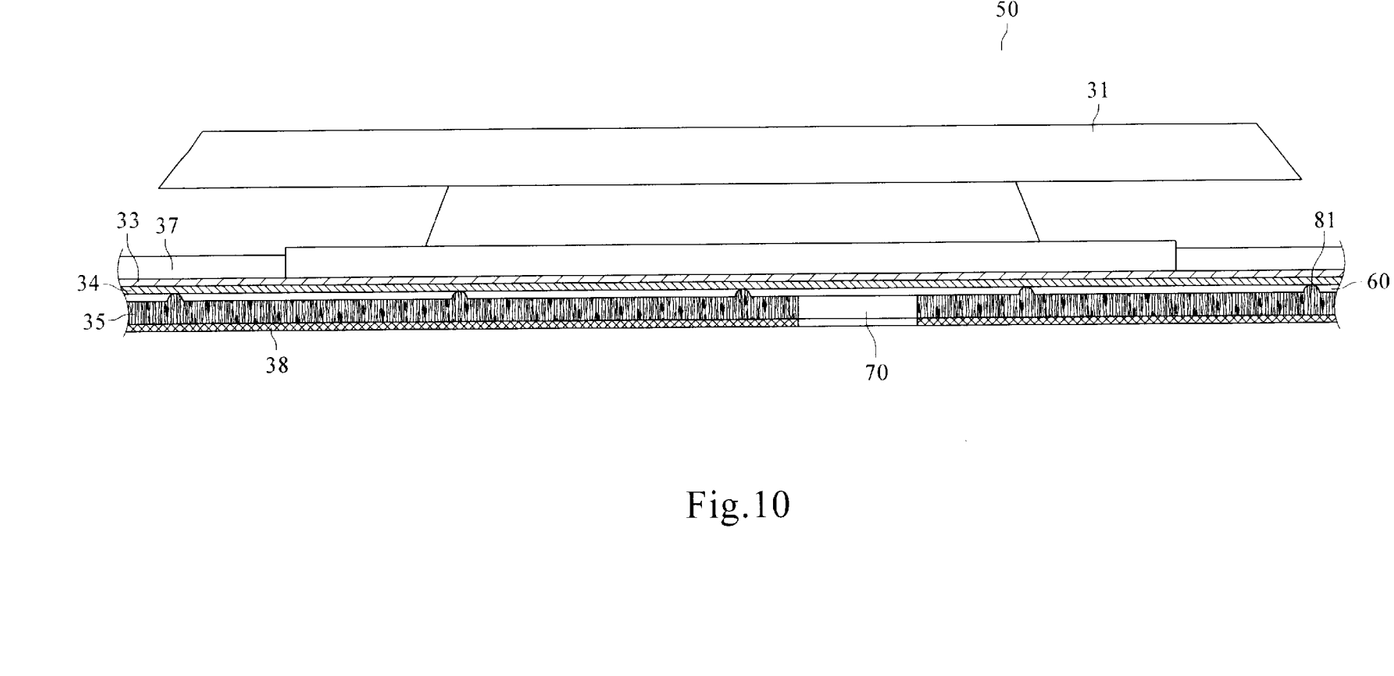
FIG. 10 shows another embodiment of the liquid-draining space shown in FIG. 9.

The dividing mechanism 81 of the present invention, as shown in FIG. 10 for the second embodiment thereof, is formed and distributed on the upper surface of the bottom board 35, and comes into contact with the upper surface of the circuit board layer 34, thus forming the liquid-draining space 60 between the circuit board layer 34 and the bottom board 35. The dividing mechanism 81 is integrally formed, e.g., by using pressure-punching method to form the dividing mechanism on the upper surface of the bottom board 35 with nodes; the preferred allocation of the dividing mechanisms is to put them in the four corners of the area beneath the keys 31.

Figure 11:
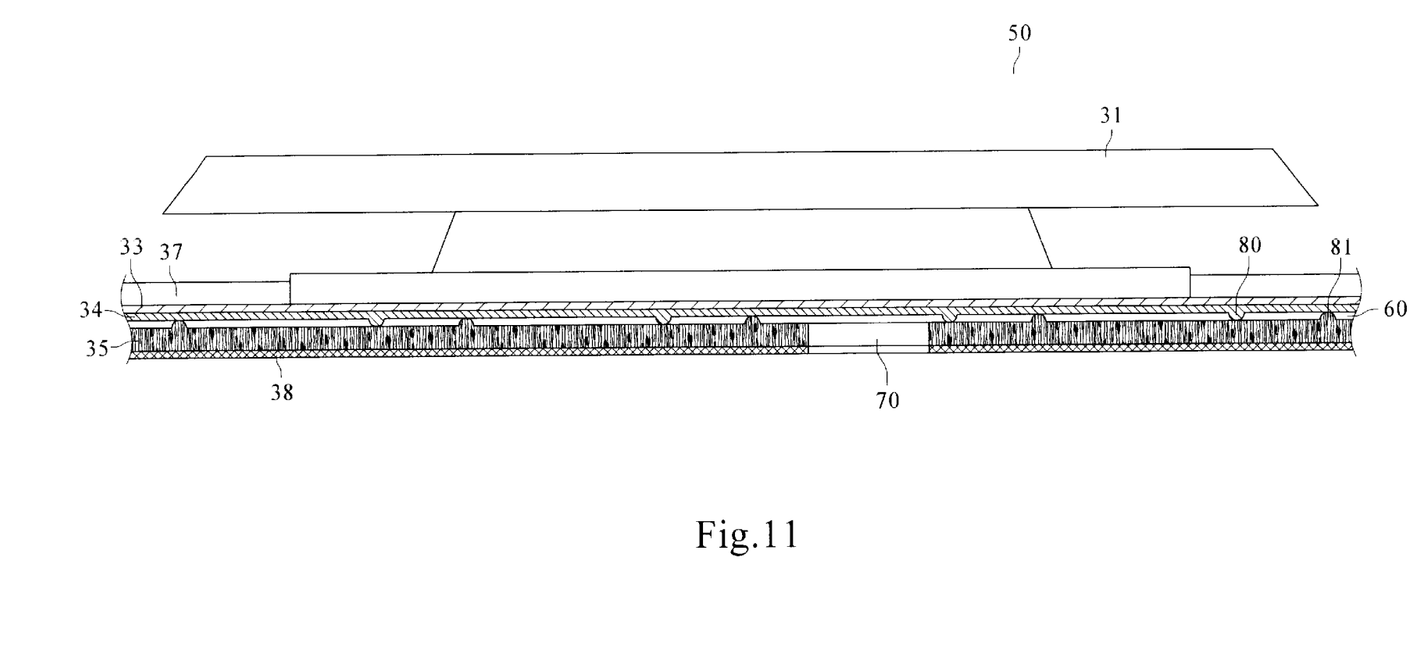
FIG. 11 shows yet another embodiment of the liquid-draining space shown in FIG. 9.

The dividing mechanism of the present invention, as shown in FIG. 11 for the third embodiment thereof, is formed on both the lower surface of the circuit board layer 34 as dividing mechanism 80, and on the upper surface of the bottom board 35 as dividing mechanism 81, with both dividing mechanisms 80 and 81 interlockingly installed, thus having the liquid-draining function as that shown in both FIG. 9 and FIG. 10.

As to the liquid-draining function, in a broader sense, liquid that can be drained away is not limited to water only, any liquid without detrimental or erosive nature, like soft drinks including tea, coke, coffee and soda, and even inks can be drained away by the present invention.

Figure 12:
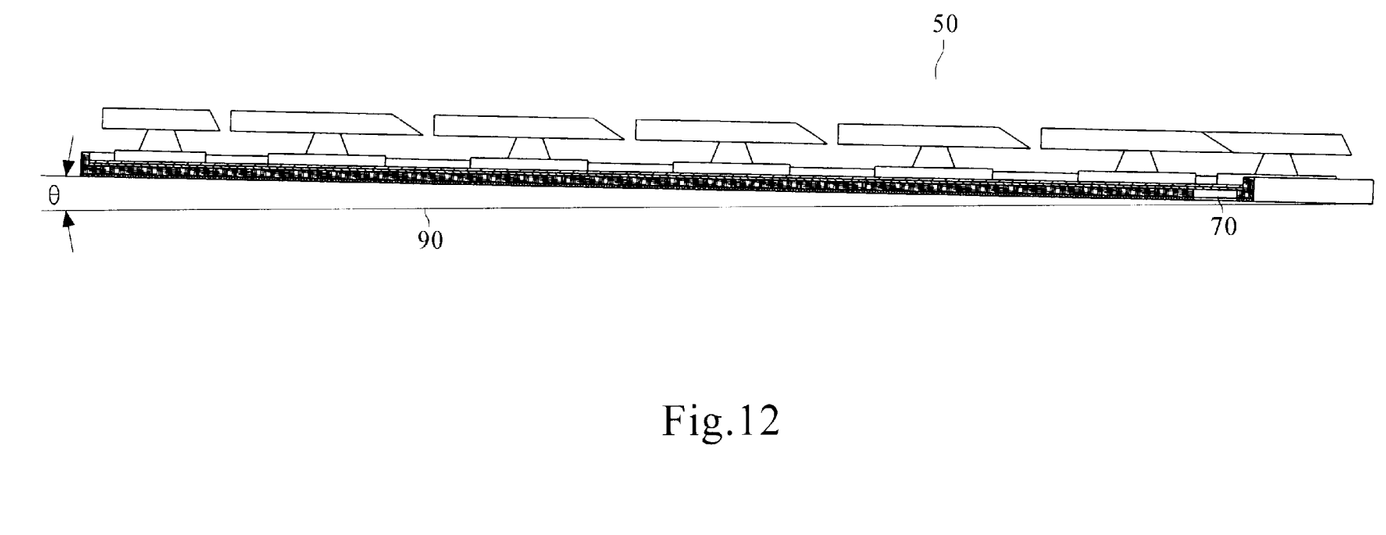
FIG. 12 shows a biasly installed keyboard of the present invention in the cross-sectional direction of line C—C shown in FIG. 7.

FIG. 12 further manifests that the keyboard 50 with liquid-draining function of the present invention is biasly installed with θ angles against the horizon 90, e.g., one-degree angle, on the casing 40 (not shown in figures); by biasly installing the keyboard 50 onto the casing 40, the excellent liquid-draining effect of the present invention can be acquired.

Certainly, for the purpose of expediting the flow of liquid through the liquid-draining hole 70, the upturning edges extending downward can be formed during the process of forming the liquid-draining hole 70 by the pressure-punching method.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

What is claimed is:

1. A keyboard with liquid-draining function, comprising:
   a plurality of keys;
   an elastic body layer installed under said plurality of keys;
   a circuit board layer installed under said elastic body layer;
   a bottom board installed under said circuit board layer, said bottom board being used for fixating said keys, said elastic body layer and said circuit board layer; and said bottom board being installed with at least one liquid-draining hole; and
   a dividing mechanism installed between said circuit board layer and said bottom board, said dividing mechanism forming a liquid-draining space between said circuit board layer and said bottom board; and said liquid-draining space being connected with said liquid-draining hole of said bottom board,
   wherein said dividing mechanism is formed and distributed on the lower surface of said circuit board layer, and comes into contact with the upper surface of said bottom board.

2. A keyboard with liquid-draining function as in claim 1, wherein said dividing mechanism is formed and distributed on the upper surface of said bottom board, and comes into contact with the lower surface of said circuit board layer.

3. A keyboard with liquid-draining function as in claim 1, wherein said liquid-draining hole is installed with protruding edges extending downward therefrom.

4. A keyboard with liquid-draining function as in claim 1, wherein said keyboard is biasly installed.

5. A keyboard with liquid-draining function as in claim 1, wherein a sealing layer is adhered to the lower surface of said bottom board.

6. A keyboard with liquid-draining function, comprising:
   a plurality of keys;
   an elastic body layer installed under said plurality of keys;
   a circuit board layer installed under said elastic body layer;
   a bottom board installed under said circuit board layer, said bottom board being used for fixating said keys, said elastic body layer and said circuit board layer; and said bottom board being installed with at least one liquid-draining hole; and
   a dividing mechanism installed between said circuit board layer and said bottom board, said dividing mechanism forming a liquid-draining space between said circuit board layer and said bottom board; and said liquid-draining space being connected with said liquid-draining hole of said bottom board,
   wherein said dividing mechanism is formed and distributed on both the lower surface of said circuit board layer and the upper surface of said bottom board; said dividing mechanism of said circuit board layer comes into contact with the upper surface of said bottom board; and said dividing mechanism of said bottom board comes into contact with the lower surface of said circuit board layer by locking installation.

* * * * *